United States Patent [19]

Closson, Jr.

[11] Patent Number: 4,824,726
[45] Date of Patent: Apr. 25, 1989

[54] LAYERED PATCHING COMPOSITION

[76] Inventor: Addison W. Closson, Jr., 50 Central St., Manchester, Mass. 01944

[21] Appl. No.: 930,693

[22] Filed: Nov. 14, 1986

[51] Int. Cl.$^4$ .............................................. B32B 27/00
[52] U.S. Cl. ...................................... 428/349; 156/94; 156/308.2; 156/315; 428/63; 428/347; 428/515
[58] Field of Search ................. 428/63, 346, 347, 349, 428/515; 156/94, 308.2, 315

[56] References Cited

U.S. PATENT DOCUMENTS

| | | | |
|---|---|---|---|
| 3,851,794 | 12/1974 | Hehl | 220/308 |
| 4,147,576 | 4/1979 | Beem et al. | 156/94 |
| 4,290,536 | 9/1981 | Morel | 220/359 |
| 4,430,133 | 2/1984 | Griffith | 156/94 |
| 4,486,254 | 12/1984 | Zinimon | 156/94 |
| 4,494,671 | 1/1985 | Moore, III et al. | 220/256 |
| 4,563,379 | 1/1986 | Krüger | 428/346 |
| 4,629,657 | 12/1986 | Gulati et al. | 428/515 |

Primary Examiner—Paul J. Thibodeau
Attorney, Agent, or Firm—Samuels, Gauthier, Stevens & Kehoe

[57] ABSTRACT

The present invention relates to a multiple-layered composition which eliminates the metal cover plate and is useful for effectively and durably sealing and plugging drain holes in workpieces. They are particularly useful in covering up drain holes in automotive bodies as a result of the unique properties which result from the total character of the multiple layers. The present invention also relates to a method of applying such a multiple-layered composition. The compositions of the present invention generally comprise:

(a) a stiff (strong) abrasion-resistant layer comprising a thermoplastic resin; or composite;
(b) a cold-shock resistant layer underlying said abrasion-resistant layer, said cold-shock resistant layer comprising a compound selected from olefinic ethylene copolymers and terpolymers, and is preferably a crosslinkable material such as ethylene-vinyl acetate copolymer or terpolymer; and
(c) optionally a hot-melt adhesive layer overlying said cold-shock resistant layer, said hot-melt adhesive layer comprising a compound selected from the group consisting of (i) ethylene copolymers; (ii) phenolic hydrocarbon resins; (iii) phenolic rosin esters; (iv) a modified phenolic terpene resin; (v) a tackifying resin; or mixtures thereof.

19 Claims, No Drawings

LAYERED PATCHING COMPOSITION

BACKGROUND OF INVENTION

The present invention relates to compositions and methods useful in reliably sealing, patching or closing a hole or opening in a workpiece such as a vehicle body. Further, the compositions and methods are particularly useful in reliably sealing, patching or closing a drain hole in an automobile body panel or the like.

In many industrial coating or treating processes, workpieces are submerged or immersed in a treatment/coating bath or solution. Such techniques provide excellent control over treatment times and allow uniform surface treatment of ordinarily inaccessible areas of the workpiece. However, removing or draining the bath or solution from the workpiece frequently requires the deliberate drilling, boring or forming of holes in the workpiece to allow prompt and controlled drainage.

For example, vehicles bodies are frequently immersed in tanks to effect a phosphate conversion coating which serves to inhibit surface oxidation and to provide a paint base. However, due to the configuration of such a workpiece, drainage of the treatment solution would be extremely difficult without the "drainage holes" that are provided to allow the solution to freely drain from the workpiece.

It will be appreciated, however, that after treatment and drainage such holes serve no useful purpose and, in fact, can create problems in later manufacturing or processing operations or steps; such holes can also be extremely detrimental to the appearance or integrity of the final product. Accordingly, it is highly desirable to seal or plug these drainage holes after the immersion and drainage steps are completed.

Most automobile drain and gauge hole covers are sealed by placing an expandable thermoplastic hot melt sealant-gasket around the edges of the cover. The sealant is softened, expanded and flowed by heat from the paint ovens. The paint ovens range in temperature from a low of 15 minutes at 230° F. to a high of 30 minutes at approximately 315° F.

Many efforts have been made to provide a satisfactory seal. For example, U.S. Pat. No. 4,494,671, issued Jan. 22, 1985, discloses a closure for such a hole in a panel which includes:
(a) a plate;
(b) a gasket;
(c) means for securing said gasket to said plate; and
(d) means for securing said plate to the panel.
The gasket is disclosed as having a thin, bottom side "low melt" compound which forms the seal when heated.

U.S. Pat. No. 3,851,794, issued Dec. 3, 1974, discloses a method of sealing a varnish exit hole in a work panel by means of a plug inserted into the hole. The plug has a closed bottom wall, a head superimposing the margins of the work panel and an annular collar joining the bottom wall to the head.

U.S. Pat. No. 4,147,576, issued Apr. 3, 1979, discloses a kit and method for repairing vehicle surfaces. In this method the surface to be repaired is covered by adhering a plastic sheet having beveled edges to the repair surface. This is followed by the step of sanding the beveled edges and adhering sealant to at least the visible edges of the repair surface. Next, it is suggested that there be a feathering of the sealant to create a smooth surface. Lastly, the repaired area is painted. The adhesives employed include a contact cement.

U.S. Pat. No. 4,290,536, issued Sept. 22, 1981, discloses a second type of sealing plug device for fitting holes in panels. These plastic plugs are made to include a thermofusible material which surrounds the plastic plug as a bead. After being put in position, the plug is treated so that the thermofusible ring melts to fill an empty space around the plug to seal the hole.

U.S. Pat. No. 4,430,133, issued Feb. 7, 1984 discloses a process for replacing damaged parts of a vehicle. In summary, the process includes placing a manufactured overdimensioned acrylic part over the damaged part and adhering this overdimensioned part to the damaged part.

U.S. Pat. No. 4,486,254, issued Dec. 4, 1984, discloses a heat-activated patch or repair composition for metal objects or surfaces. The composition contains silicate, soda and asbestos fiberous cement and lesser amounts of iron ore and an alumina-containing air set mortar. The heat-activated composition is employed in conjunction with an asbestos cloth, such as woven asbestos cloth, to provide a comparatively permanent patch or repair of a metal object and surface.

SUMMARY OF THE INVENTION

The present invention relates to a multiple-layered composition which is useful for effectively and durably sealing and plugging drain holes in workpieces. They are particularly useful in patching drain holes in automotive bodies as a result of the unique properties which result from the total character of the multiple layers. The present invention also relates to a method of applying such a multiple-layered composition thus eliminating the conventional galvanized plate covering the drainhole.

The compositions of the present invention generally comprise:
(a) a stiff (strong) abrasion-resistant layer comprising a thermoplastic resin; or composite;
(b) a cold-shock resistant layer overlying said abrasion-resistant layer, said cold-shock resistant layer comprising a compound selected from olefinic (ethylene) copolymers and terpolymers, and is preferably a crosslinkable material such as ethylene-vinyl acetate copolymer or terpolymer; and
(c) optionally a hot-melt adhesive layer overlying said cold-shock resistant layer, said hot-melt adhesive layer comprising a compound selected from the group consisting of (i) ethylene co or terpolymers; (ii) phenolic hydrocarbon resins; (iii) phenolic resins esters; (iv) phenolic modified terpene resins (v) rosin esters; or mixtures thereof.

The method comprises the steps of:
(1) providing a workpiece defining a hole;
(2) applying an abrasion-resistant thermoplastic layer over substantially all of the drainage hole;
(3) applying a cold-shock resistant layer comprising an ethylene vinyl acetate copolymer or terpolymer under said abrasion resistant layer; and
(4) optionally applying a hot-melt layer comprising a compound selected from the group consisting of (i)–(v) above, including without limitation, ethylene vinyl acetate; tackifying resins; a phenolic rosin ester or terpene; a phenolic or phenolic modified hydrocarbon resin; or mixtures thereof.

The resulting patch applied as described, such as by heat or extrusion, remains integral with the workpiece and allows the workpiece to undergo further manufacturing or processing operations even if such operations are comparatively stressful.

DETAILED DESCRIPTION OF THE INVENTION

The compositions of the present invention comprise two, and preferably three or more, distinct layers and are useful in reliably sealing or closing a hole or opening in a workpiece such as a vehicle body.

The compositions of the present invention generally comprise:
(a) a stiff (strong) abrasion-resistant layer comprising a thermoplastic resin or composite with high melt strength and low softening point;
(b) a crosslinkable cold-shock resistant elastomeric layer overlying said abrasion-resistant layer, said cold-shock resistant layer comprised of olefinic (ethylene) copolymers and terpolymers; and
(c) optionally a hot-melt adhesive layer overlying said crosslinkable cold-shock resistant layer, said hot-melt adhesive layer which bonds to ("E" coated) steel or galvanized steel and comprising a compound selected from the group consisting of (i) ethylene co- or terpolymers; (ii) a phenolic modified hydrocarbon resins and modified resin esters. The hot melt preferably contains some acid functionality.

The method comprises the steps of:
(1) providing a workpiece defining a hole;
(2) applying an abrasion-resistant thermoplastic layer over substantially all of the drainage hole;
(3) applying a cold-shock resistant layer comprising olefinic (ethylene) copolymer or terpolymers under said abrasion resistant layer; and
(4) optionally applying a hot-melt layer comprising a compound selected from the group consisting of (i) ethylene copolymer or terpolymers and tackifying resins including a phenolic modified rosin ester; or phenolic modified hydrocarbon resin or terpene.

The resulting hole covering patch applied as described, such as with heat and/or extrusion, remains integral with the workpiece and allows the workpiece to undergo further manufacturing or processing operations even if such operations are comparatively stressful.

The first of the plurality of layers of the present invention generally functions to provide abrasion resistance, impact resistance and strength in the area of the hole in the workpiece. This layer further provides stiffness and/or tensile or flexural strength to the resulting patch. It further increases the overall integrity of the patch itself by providing puncture resistance.

The laminate is applied directly over the hole defined by the workpiece. The first layer generally comprises a thermoplastic resin. Preferably, this resin has a high melt strength and a relatively low softening point. Preferred thermoplastic resin materials to be used as the first layer in the compositions and methods of the present invention possesses a melt index in the range of 0.2 to about 10, more preferably 0.4 to about 4, and still more preferably about 0.7 to about 1.5. Such thermoplastic resin components also have a preferred softening point temperature in the range of about 90° C. to about 140° C., more preferably about 100° C. to about 130° C., and still more preferably about 110° C. to about 120° C. Preferred materials include ionomers, olefinics, styrenics and other materials of these types or classes. Highly preferred materials include materials such as "Surlyn A-1707", manufactured by Du Pont; or "Chemplex 6187 High Density Polyethylene", manufactured by Chemplex Company. Such materials generally have moderate to high molecular weights in the range of about 40,000 to about 250,000, more preferably about 70,000 to about 110,000, and still more preferably about 85,000 to about 90,000. Mixtures of such materials may also be employed.

The abrasion-resistant thermoplastic layer employed in the compositions and methods of the present invention may be reinforced with mineral or glass fiber, or other reinforcing materials or fillers, to increase melt strength and stiffness. Useful materials include aramid, carbon, glass, and mineral fiberous materials as well as hybrid materials suitable for such use. A particularly useful reinforcement material is a mineral fiber manufactured by Jim Walter Resources. Mixtures of such materials may also be employed.

The second cold-shock resistant layer useful in the compositions and methods of the present invention generally comprises crosslinkable ethylene copolymers or terpolymers, or mixtures thereof. Suitable materials are generally derived from basic ethylene polymeric technology. Such materials are prepared in a fashion similar to that of low density polyethylene, although a lower temperature is normally employed. Useful grades of ethylene copolymers include those that are in the range of about 5 to about 50 percent comonomer, more preferably about 15 to about 35, and most preferably about 18 to about 30 percent comonomers content. Highly preferred materials include the ethylene acrylic acid copolymer "Elvax II-5950"; the ethylene-vinyl acetate copolymer "Elvax-40"; and the ethylene-vinyl acetate terpolymer "Elvax-4260"; all manufactured by E. I. Du Pont de Nemours & Co., Inc. Mixtures of such materials may also be employed.

In a highly preferred embodiment, the ethylene copolymer or terpolymer includes an acid functionality. In another preferred embodiment, the ethylene copolymers contain an active crosslinking ingredient or agent, such as dicumyl peroxide. In another highly preferred embodiment the final composition of the cold-shock resistant layer has an average monomer to co-monomer weight ratio of about 1–1.5 to about 1:20, and preferably about 1:1.

Without limitation, such materials provide, and are selected to produce, good flexability and adhesion; good resiliency and shock resistance or absorption; and good strength to weight ratios.

Other suitable mixtures or laminates may be employed such as propylene-ethylene copolymer; ABS, styrenic block copolymer, and styrene acid-ionomer combination.

The second, crosslinking cold-shock layer is generally applied directly under the first, stiff abrasion resistant high melt strength layer.

The second cold-shock resistant layer of the compositions and methods of the present invention optionally employ a foaming agent or a chemical blowing agent (CBA). Such agents generally liberate a gas such as nitrogen ammonia, carbon dioxide, and the like. These materials allow a weight reduction with good rigidity, stiffness, and weight to strength ratios. Such materials include p,p'-oxybis-(benzenesulfonyl hydrazide) (OBSH), such as the KEMPORE materials sold by Olin Chemical. Also useful are the CELOGEN AZ series materials, available from the Uniroyal, Inc., Chemical Group. Other suitable CBA or foaming agents may be employed.

Layer two primarily provides flexibility, cold-shock resistance and crosslinkability and is preferably formulated to allow the second layer to be bonded tightly to the abrasion and impact resistance layer by virtue of the ionic cross linking properties/sites of the materials employed in layer one. This second layer also provides low extrusion temperature processability.

The compositions and methods of the present invention optionally employ a third layer of hot-melt adhesive. This layer generally comprises a compound selected from the group consisting of (i) ethylene co- and terpolymers; (ii) a tackifying resins; (iii) a phenolic modified rosin esters, and (iv) a phenolic hydrocarbon resins including terpenes rosin esters or other rosin derivatives, and mixtures thereof.

Layer three, as described above, provides adhesion and bonding properties that allow the entire patch to be well bonded to various substrates which include metallic and organic materials.

The polar phenolic hydrocarbon resins useful in the third hot-melt layer of the compositions and methods of the present invention are generally characterized as a reaction product of a phenol and an aldehyde; formaldehyde is the preferred aldehyde. Preferred materials are "two-stage" phenolic resins (novolacs) comprising an excess of phenol, formaldehyde and an acid catalyst. They may be flake, powder, or solid systems; powder or flake systems are preferred. A preferred material is a phenolic hydrocarbon resin termed "Nevillac" manufactured by Neville Chemical Company, Pittsburg, Pa.

Another resin useful in the optional third hot-melt layer of the compositions and methods of the present invention are phenolic modified terpene resins. These are generally prepared by polymerizing beta-pinene and dipentene. Such materials are generally used in hot-melt adhesives. Preferred materials for use in the compositions and methods of the present invention include a phenolic modified terpene such as "Piccofin T-135", marketed by Hercules, as well as "Super Nirez 6040", marketed by Reichold Chemicals, Inc., White Plains, N.Y.

Another resin useful in the third hot-melt layer of the compositions and methods of the present invention are rosin esters. Such materials include flaked rosin esters, and modified rosin esters with some acid functionality. Preferred materials include a pulverized rosin acid such as "Pentalyn H" marketed by Hercules Company; and a modified rosin ester with both an acid and high polar functionality such as "Pentalyn B-25", supplied by Hercules Company, Wilmington, Del.

A laminated plastic composite cover must be able to settle evenly into the drain hole with both low and high oven temperatures. The oven should activate and relax the cover with low heat, so the cover cannot bridge high across the floor pan at 230° F. or sag too much below the floor pan at temperatures above 250° F. The Surlyn ionomer has been selected to give a good tight fit around the edges of the drain hole and conform to any unevenness in the surrounding floor pan, because the Surlyn's low vicat softening point gives it the necessary low temperature conformity. The fiber reinforcement and polymer additive raises the vicat enough to cope with hot environmental stress, but still allows it to conform and fit. At above 250° F., however, the cover would begin to sag except for the fact that the middle layer starts to crosslink and prevent the laminate from softening any further. By the time it reaches 300° F. it has cross linked fully, preventing any further sag or shape changes. At the beginning of the oven heat cycle, the high melt strength of the ionomer prevents excessive sag from occurring before the middle layer has cross linked and during its transition into a cured state.

In addition to these layers, additional layers may be added or repeated as needed. These may be of substantially the same materials as described above, or other materials. The selection of such additional materials is well within the skill of the artisan in light of the instant disclosure.

EXAMPLE

A composition for repairing drain holes in vehicle bodies or the like is prepared as follows.

LAYER NUMBER 1

As discussed above, this layer consists of a thermoplastic resin with high melt strength and relatively low softening point. Optionally it is reinforced with mineral and glass fiber or other reinforcing fiber to increase melt strength.

|   | Composition | % by wt. |
|---|---|---|
| (i) | Du Pont Manufactured Ionomer Surlyn A-8920 (with melt index 0.7 and Vicat softening point 140° F.) | 70 |
| (ii) | Chemplex Manufactured High Density Polyethylene Chemplex 6187 | 20 |
| (iii) | Jim Walter Resources Manufactured Process Mineral Fibers | 10 |
|   | TOTAL | 100 |

LAYER NUMBER 2

This layer is compounded with Ethylene Copolymers and Terpolymers optionally with acid functionality. It is preferably elastomeric to provide cold-shock resistance. Optionally it contains active peroxide ingredient, preferrably Di-Cumyl Peroxide.

|   | Composition | % by wt. |
|---|---|---|
| (i) | Du Pont supplied Ethylene Vinyl Acetate - Acrylic Acid Terpolymer Elvax II 5650T | 48 |
| (ii) | Du Pont supplied Ethylene Vinyl Acetate (40%) Co-Polymer Elvax-40 Ethylene Vinyl Acetate | 24 |
| (iii) | Du Pont supplied Ethylene Vinyl Acetate Terpolymer Elvax-4260 (28% vinyl acetate and about 7% methacrylic acid) | 24 |
| (iv) | R. T. Vanderbilt supplied Dicumyl Peroxide | 4 |
|   | TOTAL | 100 |

LAYER NUMBER 3

This layer is generally a hot-melt layer. It consists of Ethylene Vinyl Acetate Co-Polymer and Terpolymer, optionally with acid functionality. It is compounded with Tackifying Resin, modified Phenolic Resin Esters, modified Phenolic Hydrocarbon Resins and/or a Hindered Phenolic Anti-Oxidant.

|   | Composition | % by wt. |
|---|---|---|
| (i) | Neville Chem. Co. supplied Phenolic Hydrocarbon Resin "Nevillac" | 7 |
| (ii) | Reichold supplied Phenolic Modified Terpene Super Nirez 6040 | 4.8 |
| (iii) | Ciba Geigy Co. supplied Hindered Phenol | 1.6 |

| | Composition | % by wt. |
|---|---|---|
| | Antioxidant Irgonox-1010 | |
| (iv) | Hercules Co. supplied Flaked Rosin Ester Pentalyn H | 32.7 |
| (v) | Hercules Co. supplied Modified Phenolic Rosin Ester with some acid functionality - Pentalyn B-25 | 4.7 |
| (vi) | Du Pont Co. supplied Ethylene Vinyl Acetate Acid Terpolymer Elvax-4260 28% Vinyl Acetate and methacrylic acid (4% approx.) | 9.4 |
| (vii) | Du Pont Co. supplied Ethylene Vinyl Acetate Acid Terpolymer Elvax II-5650T | 39.8 |
| | TOTAL | 100 |

The above layers are applied to the drainage hole of an automobile body, in the order recited and by any convenient method such as by heat applications or extrusion. The resulting layered patch demonstrates good durability and strength.

What is claimed is:

1. A laminate article useful in the covering of a hole in a workpiece comprising:
   (a) an abrasion-resistant layer comprising a thermoplastic resin having a melt index in the range of 0.2 to about 10;
   (b) a crosslinking cold-shock resistant layer underlying said abrasion-resistant layer, said cold-shock resistant layer comprising a polymeric material selected from the group consisting of ethylene copolymers, terpolymers, and mixtures thereof; and
   (c) a hot-melt adhesive layer underlying said cold-shock resistant layer, said hot-melt adhesive layer comprising a compound selected from the group consisting of (i) ethylene copolymers; (ii) phenolic hydrocarbon resins; (iii) phenolic rosin esters; (iv) phenolic hydrocarbon terpene resins; (v) a rosin ester tackifying resin; and mixtures thereof.

2. A article according to claim 1 wherein the thermoplastic resin of the abrasion-resistant layer has a melt index in the range of about 0.2 to about 10 and a softening point in the range of about 100° C. to about 130° C.

3. An article according to claim 1 wherein the thermoplastic resin of the abrasion-resistant layer comprises an ionomer.

4. An article according to claim 1 wherein the thermoplastic resin of the abrasion-resistant layer comprises a plurality of olefinic polymers.

5. An article according to claim 1 wherein the abrasion-resistant layer includes a reinforcing material for adjusting the relative melt strength of said abrasion-resistant layer selected from the group consisting of aramids, carbon, minerals, fibers, glass fibers, glass spheres and mixtures thereof.

6. An article according to claim 4 wherein the abrasion-resistant layer comprises a ethylene copolymer having a comonomer content in the range of from about 5 percent to about 50 percent.

7. An article according to claim 1 wherein the cold shock resistant layer of ethylene copolymer or terpolymers additionally comprises a chemical blowing agent.

8. An article according to claim 1 wherein the ethylene-copolymer or terpolymer layer has an acid functionality.

9. An article according to claim 1 wherein the cold-shock resistant layer comprises an active crosslinking peroxide.

10. An article according to claim 9 wherein the active peroxide decomposes at a temperature of less than 140° C.

11. An article according to claim 1 wherein the ethylene copolymer has an average monomer to comonomer weight: weight ratio of about 1 to 1 to about 1 to 20.

12. An article according to claim 1 wherein the hot-melt adhesive layer includes a phenolic modified tackifier.

13. An article according to claim 12 wherein the hot melt includes a rosin ester tackifier.

14. A method of sealing, patching or closing a hole or opening in a workpiece comprising the steps of:
   (1) providing a workpiece defining a hole;
   (2) applying a crosslinking cold-shock resistant layer comprising a mixture of ethylene copolymers or terpolymers over the hole; and
   (3) applying an abrasion resistant thermoplastic layer comprising a resin having a melt index in the range of 0.2 to about 10, over the cold-shock resistant layer;
   (4) heating said layers of steps (1) and (2) for discriminate melting of the layers thereby allowing said layers to meld into said hole and conform to the hole and surrounding workpiece surfaces for adhering thereto and curing therein.

15. A method according to claim 14 which comprises the additional step of applying a hot-melt layer comprising a compound selected from the group consisting of (i) ethylene copolymers; (ii) rosin esters; (iii) phenolic modified rosin esters; (iv) terpenes; (v) phenolic hydrocarbon resins, and mixtures thereof, prior to step (ii) above.

16. A method according to claim 14 wherein the thermoplastic resin of the abrasion-resistant layer has a melt index in the range of about 0.2 to about 10 and a softening point in the range of about 100° C. to about 130° C.

17. A method according to claim 14 wherein the thermoplastic resin of the stiff abrasion-resistant layer is an ionomer.

18. A method according to claim 14 wherein the thermoplastic resin of the stiff abrasion-resistant layer is an olefin.

19. A method according to claim 14 wherein the abrasion-resistant layer includes a reinforcing material selected from the group consisting of aramids, carbon, minerals, glass spheres or fibers, and mixtures thereof.

* * * * *